United States Patent
Mitsch et al.

(10) Patent No.: US 9,441,703 B2
(45) Date of Patent: Sep. 13, 2016

(54) TEMPERATURE-INDEPENDENT VIBRATION DAMPER

(75) Inventors: Franz Mitsch, Heppenheim (DE); Mathias Dörsam, Birkenau (DE)

(73) Assignee: ESM ENERGIE-UND SCHWINGUNGSTECHNIK MITSCH GMBH, Rimbach-Mitlechtern (DE)

( * ) Notice: Subject to any disclaimer, the term of this patent is extended or adjusted under 35 U.S.C. 154(b) by 0 days.

(21) Appl. No.: 14/238,545

(22) PCT Filed: Jul. 10, 2012

(86) PCT No.: PCT/EP2012/002895
§ 371 (c)(1),
(2), (4) Date: Mar. 6, 2014

(87) PCT Pub. No.: WO2013/023724
PCT Pub. Date: Feb. 21, 2013

(65) Prior Publication Data
US 2014/0196999 A1   Jul. 17, 2014

(30) Foreign Application Priority Data

Aug. 18, 2011   (EP) ..................................... 11006749

(51) Int. Cl.
*F16F 7/108*   (2006.01)
*F16F 13/04*   (2006.01)
*F16F 3/08*    (2006.01)

(52) U.S. Cl.
CPC ............... *F16F 13/04* (2013.01); *F03D 13/20* (2016.05); *F16F 3/08* (2013.01); *F16F 7/108* (2013.01); *F05B 2260/96* (2013.01); *Y02E 10/728* (2013.01)

(58) Field of Classification Search
CPC .......... F16F 7/108; F16F 15/12; F16F 15/08; F16F 15/136; F16F 15/1435; F16F 1/3732; F16F 1/3735; F16F 1/374; F16F 1/3835; F16F 1/1393; F16F 1/3935; F16F 1/141; F16F 1/406; F16D 3/12; F16D 3/58; F16D 3/68; F16D 3/74; F16D 3/08; G11B 33/08
See application file for complete search history.

(56) References Cited

U.S. PATENT DOCUMENTS 2,365,421 A * 12/1944 Lord ...................... B64D 27/00
                                                      248/556

(Continued)

FOREIGN PATENT DOCUMENTS

DE   2 342 370         2/1974
DE   EP 1619410 A1 *   1/2006   ............... F16D 3/12

(Continued)

OTHER PUBLICATIONS

International Search Report for corresponding PCT application mailed Nov. 23, 2012.

*Primary Examiner* — Bradley King
*Assistant Examiner* — Stephen Bowes
(74) *Attorney, Agent, or Firm* — Davis & Bujold PLLC; Michael J. Bujold (57) ABSTRACT

A temperature-compensating damping element, which is suitable for the temperature-independent reduction of vibrations, which has a fixed, non-elastic outer part and a fixed, non-elastic inner part, which is either inserted fully or partly into a mating cut-out or opening of the outer part. The outer and inner parts have contact surfaces which are connected to one another by an elastic layer which comprises an elastomer material and which is, or can be, pre-tensioned with respect to a desired frequency by a tensioning element. The elastic layer which is responsible for the vibration damping is directly connected at one or more points to an additional elastic volume. The additional elastic volume is a multiple of the volume of the elastic layer, and has the effect that the excitation frequency of the damping element changes in the case of a temperature change within a temperature range.

14 Claims, 5 Drawing Sheets

(56) References Cited

U.S. PATENT DOCUMENTS

| | | | | |
|---|---|---|---|---|
| 2,523,504 A | * | 9/1950 | Ford, Jr. | F16F 1/3935 248/557 |
| 3,800,064 A | * | 3/1974 | Lusk | H02G 15/06 174/11 BH |
| 3,817,506 A | | 6/1974 | Jarret et al. | |
| 3,826,339 A | * | 7/1974 | Brokaw | F16F 7/108 174/42 |
| 4,148,354 A | * | 4/1979 | Rao | F28D 19/042 165/10 |
| 4,150,085 A | * | 4/1979 | Rao | F28D 19/042 264/262 |
| 4,269,570 A | * | 5/1981 | Rao | F01D 5/025 415/217.1 |
| 5,366,210 A | | 11/1994 | Grunau et al. | |
| 2013/0256961 A1 | | 10/2013 | Schlittler et al. | |

FOREIGN PATENT DOCUMENTS

| | | |
|---|---|---|
| EP | 0 562 161 A1 | 2/1992 |
| EP | 1 286 076 A1 | 2/2003 |
| EP | 1 693 593 A1 | 8/2006 |
| EP | 2 284 416 A1 | 2/2011 |
| JP | 11210832 A * | 8/1999 |
| WO | 90/07673 A1 | 7/1990 |

* cited by examiner

TEMPERATURE-INDEPENDENT VIBRATION DAMPER

This application is a national stage completion of PCT/EP2012/002895 filed Jul. 10, 2012 which claims priority from European Application Serial No. 11006749.3 filed Aug. 18, 2011.

FIELD OF THE INVENTION

The invention relates to a damping element which is based on elastic materials and which, owing to simple design measures, is substantially independent of varying ambient temperatures in relation to a pre-set frequency at which the component is intended to damp.

The invention relates, in particular, to corresponding vibration dampers which have one or more damping elements of this type and to the use of damping elements and dampers of this type in machine structures, in particular wind turbines, which are subject to naturally large temperature variations.

BACKGROUND OF THE INVENTION

The physical principles of a vibration damper are known in principle. Vibration dampers must be matched to the frequency of the component to be damped. The matching of the damper frequency can be achieved on the one hand by the change in the stiffness of the spring elements employed, on the other hand by a change in the damper mass. Limits are naturally imposed on the change in the damper mass of a certain system to be damped, and a change in the damper mass is therefore hardly used in practice. This leaves the variation in the spring stiffness.

On use of elastic materials in modern dampers, however, this is in principle dependent on the temperature. A spring stiffness set at a certain temperature and matched to the system to be damped changes with the ambient temperatures. Whereas this effect is often negligible in the case of structures to be damped in buildings, it plays a not inconsiderable role in the case of outdoor structures, such as, for example, in the case of wind turbines. Wind turbines are usually subjected to large temperature variations between −20° and +50° C. at which they are still operated, depending on the location. The spring stiffness of the damping parts employed and thus the excitation frequency of the system consequently changes, meaning that optimum damping or no damping at all of vibrations which occur in the structure can take place without re-adjustment of the spring stiffness of the damping parts being necessary. However, this is complex and thus expensive, if possible at all.

It is therefore an aim to employ dampers which only react insignificantly, or not at all, to changes in temperature with a change in the pre-set damper frequency.

DE 2342370 describes a hydrostatic compression spring based on a precompressed elastomer which fills a chamber and is connected in series before a second elastic spring (chamber), where the volume of the second elastic spring is significantly smaller than the elastomer which experiences the actual push deformation. The two elastomeric chambers are not connected directly. The operating behaviour of the entire compression spring is substantially the same at different temperatures due to this design.

EP 0562 161 describes vibration dampers comprising a damper mass which is arranged in a movable manner on a spring element comprising elastomeric material and which can be set in motion with a phase shift to vibrations introduced as a consequence of operation, where the spring element is fixed on a part generating the vibrations. A supplementary spring connected in parallel whose spring stiffness can be changed by aids based on mechanical movement processes is assigned to the spring element for compensation of temperature influences.

EP 2 284 416 solves the problem of temperature change by the actual elastic damping element having an electronically controllable heating element which is controlled in accordance with the ambient temperatures.

The temperature-independent damper systems described in the prior art are in some cases quite complicated, on the other hand they only work optimally in certain limited temperature ranges. Owing to the dimensions of wind turbines and the considerable temperature differences during operation, these proposed damper systems are of only limited suitability.

These also include the concepts of the dampers which are described, for example, in EP 1 286 076 A1 and EP 1 693 593 B1. EP 1 286 076 discloses a linear vibration damper whose spring/mass system is composed of the actual functional parts in or on which damping takes place, and the damper mass. The damper is set in advance via the functional part, usually before or immediately after installation into the system to be damped, so that the damper mass vibrates close to the excitation frequency with the opposite phase. The damper is thus permanently tuned to a certain excitation frequency. This setting is carried out by means of tensioning devices via the functional part. In this case, the rubber layer within the functional part is pretensioned. A reduction in the rubber pretensioning force causes a reduction in the damper frequency; an increase in the rubber pretensioning within the functional part results in a higher damper frequency. The functional parts have conical or spherical surfaces which are provided with elastomer material and form a certain angle with the longitudinal axis of the damper. EP 1 693 593 describes an adjustable three-axis damper which is based on the same principle, but comprises a multiplicity of correspondingly shaped and arranged functional parts of this type.

This rubber pretensioning in the prior-art dampers described and in other prior-art dampers is, however, dependent on the rubber temperature and/or the ambient temperature. Thus, the damper frequency changes in the case of temperature variations. This results in a damper only being able to act optimally at the temperature at which it was also set. Deviations of as little as 10° C. here can result in complete functional failure of the damper. This phenomenon is dependent on the rubber used, but is always present independently thereof. The use of dampers in accordance with the above functional principle thus requires constant ambient temperatures. However, precisely this fact is not given in most application cases. In the case of most outdoor applications, a damper must act in a large temperature range (about −20° C. to +50° C.). This is not possible with the current state of the art. For this reason, it makes sense to develop a damper which maintains its set inherent frequency over a broad temperature spectrum.

SUMMARY OF THE INVENTION

The object was thus to provide a simple and effective damping system which works over a large temperature range, in particular for use in wind turbines.

The object has been achieved by the vibration dampers, or the corresponding damping elements according to the invention, as described in greater detail below.

The invention relates to the following:

A damping element (1) which is suitable for the temperature-independent reduction of vibrations, essentially consisting of a fixed non-elastic outer part (1.4) and a fixed, non-elastic inner part (1.3), which is inserted fully or partly with a good fit into a correspondingly shaped cut-out or opening of the outer part, where outer and inner parts have contact surfaces which are connected to one another by an elastic layer (1.2) which consists of an elastomer material and which is or can be pretensioned with respect to a desired frequency by tensioning means, where the elastic layer (1.2) responsible for the vibration damping is connected directly at one or more points to an additional elastic volume (1.1), where the additional elastic volume (1.1) is 5 to 100 times, preferably 5 to 25 times, in particular 10-20 times the volume of the elastic layer (1.2), and has the effect that the frequency of the damping element remains substantially constant in the case of a change in temperature, where a change in the set excitation frequency of max. 10-20%, preferably max. 0-10%, occurs in the case of a temperature change in a range between −30° C. and +50° C.

A corresponding damping element (1) (2) in which the additional elastic volume (1.1) is accommodated in the outer part (1.4) (2.3), and/or in the inner part (1.3) (2.2), and/or outside the damping element or damper.

A corresponding damping element in which the additional elastic volume (1.1) (13) is part of the volume of the elastic layer (1.2) and is formed by cut-outs or cavities in the contact surfaces of the outer and inner parts (1.1) (1.3) of the damping element.

A corresponding damping element in which the additional elastic volume (1.1) (13) has a temperature-dependent coefficient of expansion which is greater than the coefficient of expansion of the elastomeric layer (1.2).

A corresponding damping element in which the additional elastic volume (1.1) can additionally be compressed or decompressed by pressure means, where the pressure means comprise one or more tensioning screws (8), or a metal bolt (18-21) operated, for example, by an electrical magnet coil, or an actively adjustable elastomer element (14).

A corresponding damping element in which the additional elastic volume is an elastomer material, a gas, a liquid or a viscous material, where a liquid is enclosed which changes into a different physical state (liquid-solid, solid-liquid) in the case of a change in temperature.

A temperature-independent vibration damper comprising a damper mass (1) and at least one damping element as described above.

A corresponding temperature-independent vibration damper which has two damping elements, as described, where the two damping elements are or can be tensioned against one another by tensioning means (7).

A corresponding temperature-independent vibration damper which has first and second damping elements, as described, where the second damping element has no additional elastic volume (1.1) in the outer and/or inner parts (2.3) (2.2), and the two damping elements are or can be tensioned against one another by tensioning means (7).

A corresponding temperature-independent vibration damper in which the additional volume (1.1) (13) of the damping elements (1) and (2) together is 5-50 times, preferably 10-20 times, larger than the volume of the elastomer layers (1.2) and (2.1) together.

The use of a corresponding vibration damper for the reduction of vibrations essentially independently of the temperature of the damper, in particular in wind turbines.

BRIEF DESCRIPTION OF THE FIGURES

FIG. 2.1: shows a vibration damper according to the invention having two damping elements (1) and (2) tensioned against one another and an additional elastomer volume which is arranged radially to the tensioning direction in the upper damping functional part.

FIG. 2.2: shows the damper according to the invention from FIG. 2.1, but which additionally has fine adjustment means (8) in order finely to adjust and adapt the pretensioning in the additional elastomer volume.

DETAILED DESCRIPTION OF THE DRAWINGS

The novel dampers/damping elements according to the invention are based on the following physical circumstances: (i) shrinkage of elastomer volumes causes a reducing inherent frequency, since the pretensioning [mm] of the mutually tensioned functional parts (1+2) against one another is thus reduced, (ii) hardening of the rubber layers (1.2+2.1) on the other hand allows the inherent frequency of the damper to increase, since the spring stiffnesses [N/mm] of the two rubber layers (1.2+2.1) increases.

Due to temperature variations, the rubber layers (1.2+2.1) within the functional parts (1+2) according to the invention are subjected to two different effects. On the one hand the rubber layers (1.2+2.1) harden with falling temperature, on the other hand the rubber volume within the rubber layers (1.2+2.1) shrinks. The opposite effect is observed with rising temperature.

In practice, an increase in the (pre-set) damper frequency in the case of falling temperature is observed, and a decrease in the case of rising temperatures. The effect of hardening in the case of falling temperatures is thus dominant.

The damping elements and dampers according to the invention now have design features which have the effect that the shrinkage of the elastomer material of the functional parts in the case of a drop in temperature increases more than the hardening which occurs simultaneously, or, in the case of an increase in temperature, the shrinkage process is reversed to a greater extent than the hardening of the elastomer material. It is thus possible mutually to compensate the two effects completely or approximately in a simple manner.

This becomes possible through additional elastomer volumes which are connected directly to the elastic materials of the actual functional parts that are responsible for the push deformation in the case of vibration forces caused by operation and preferably, but not necessarily, do not themselves participate in the push deformation. Surprisingly, it has been found that the compensation effect described above can be applied particularly optimally and in a particularly large temperature range (−20° to +50° C., preferably −15° C. to +40° C.) if the volume of the said additional elastomer volume (1.1) is 5 to 100, preferably 5 to 50, in particular 10 to 20, times larger than the elastomer volume (1.2/2.1) of the functional part (1), or (2) responsible for the push deformation/damping.

The invention thus relates to a damping element (1) (2) which is suitable for the temperature-independent reduction of vibrations, essentially consisting of a fixed non-elastic outer part (1.4) (2.3) and a fixed, non-elastic inner part (1.3) (2.2), which is inserted fully or partly with a good fit into a correspondingly shaped cut-out or opening of the outer part, where outer and inner parts have contact surfaces which are connected to one another by an elastic layer (1.2) (2.1) which consists of an elastomer material and which is or can be pretensioned with respect to a desired excitation frequency by tensioning means, where the elastic layer (1.2) responsible for the vibration damping is connected directly at one or more points to an additional elastic volume (1.1) (13), where the said additional elastic volume is 5 to 100 times, preferably 5 to 50 times, in particular 10 to 20 times the volume of the elastic layer (1.2), and has the effect that the set excitation frequency of the damping element remains substantially constant in the case of a change in temperature.

In accordance with the invention, the term "substantially constant" is to be taken to mean that, in the case of a temperature change in the range between −20° C. and +50° C., preferably between −10° C. and +30° C., the excitation frequency changes not more than 0%, 5%, 10%, 15% or 20%, at most 10-20%, preferably not more than 0-10%, in particular not more than 0-5%, compared with the pre-set frequency at a certain temperature.

The additional rubber/elastomer volume (1.1) is in direct contact with the rubber layer (1.2). If the functional part (1) is now cooled, a larger rubber volume than before contracts. The above-described effect of the reducing inherent frequency of the damper due to shrinkage of the rubber volume is thus augmented. This rubber shrinkage which is now greater has the consequence of a smaller pretensioning force, of the functional parts (1.2+2.1) tensioned against one another. The larger the additional rubber volume (1.1) is selected, the greater the reduction in the damper frequency due to this effect comes out. Depending on the system properties, a 5-100-times, preferably 10-20-times additional elastomer volume (1.1) compared with the elastomer layers (1.2) (2.1) has proven optimal in accordance with the invention.

In the case of precise determination of the size of the elastomer volume, the following parameters should be taken into account:

(i) Coefficient of thermal expansion of the elastomer material in the functional part (1.2) (2.1). The greater this is, the more additional elastomer volume (1.1) is required. The coefficient of thermal expansion of the material of the functional part is preferably equal to or less than that of the additional elastomer volume. In this case, it is sufficient for the volume of the additional elastomer material (1.1) to be about 5-20, preferably about 10 times larger than that of the functional part.

(ii) Coefficient of thermal expansion of the elastomer material in the additional elastomer volume (1.1). The greater this is, the less additional volume (1.1) is required. The coefficient of thermal expansion of the material of the additional elastomer volume is preferably equal to or greater than that of the functional part. In this case, it is sufficient for the volume of the additional elastomer material (1.1) to be about 5-20, preferably about 10 times larger than that of the functional part (1), (2).

(iii) Volume of the elastomer layer (1.2) (2.1) of the functional part (1) (2). The larger this layer, the larger the additional elastomer volume (1.1) must be. The volume is also determined by the layer thickness.

(iv) Layer thickness of the elastomer of the functional part. In general, the layers (1.2) (2.1) for damping elements according to the invention employed in wind turbines are between 2 mm and 20 mm thick. In the case of layer thicknesses between 2-10 mm, the additional elastomer volume (1.1) should in accordance with the invention optimally be about 10 times as large as the volume of the layer thickness of the functional part. If a thick rubber layer is implemented, the effect of the change in pretensioning force due to rubber shrinkage will come out less than if this is thin (for the same elastomer volume (1.1)). This can be explained by the rubber contour on the face being constricted or bulging towards the outside due to a change in volume of the rubber in the case of a thick layer. This causes a reduction in the change in the pretensioning force and thus in a change in the pretensioning distance. In the case of a thin rubber layer, by contrast, this effect comes out greater, as desired. In general, it can be stated that a relatively thick rubber layer has a longer lifetime for the same deformation distance. If this rubber layer is now selected to be excessively thin, this may result in premature failure of the damper.

(v) Material of the elastomer layers (2.1/1.2): if these layers are made, for example, of silicone, the influence of the temperature on the damper frequency is less. The additional elastomer volume (1.1) can thus come out smaller.

(vi) Temperature range or temperature difference in/at which the damper according to the invention is intended to work. The larger the desired temperature range is to be, the greater the additional elastomer volume (1.1) must be. About 10 times the elastomer volume (1.1) compared with the elastomer volume of the functional part (1.2) (2.1) is per se optimal in a temperature range from −10° C. and +30° C. At higher working temperatures up to +40° C., 10 to 20 times the volume (1.1) should be provided, 20 to 100 times in the case of even higher temperatures.

The additional rubber volume (1.1) must be adjusted in such a way that it precisely compensates for the effect of rubber hardening in the case of falling temperature. Since the change in the rubber volume and the rubber hardening are approximately linear in the temperature range (−10° C. to +60° C.), mutual compensation in this temperature range is possible. Ultimately, the spring stiffness of the two functional parts (1.2+2.1) must be constant at the common tensioning point, irrespective of the temperature. If this is the case, the damper frequency set will also be constant.

In contrast to the temperature-independent dampers of the prior art described above, all dynamic movements which occur in the case of push deformation during damping are absorbed by the elastomer material, in particular in the additional elastomer volume (1.1), in the case of the dampers/damping elements according to the invention.

In accordance with the invention, a damping element (1) (2) comprises a non-elastic outer part, usually made from metal (1.4) (2.3) a likewise non-elastic inner part (1.3) (2.2) and an elastic layer (1.2) (2.1) which separate outer and inner parts from one another. This elastic layer between the contact surface of outer part and inner part preferably consists of unvulcanised rubber/vulcanised rubber, synthetic plastic, such as PU or silicone, or elastic mixtures thereof. The selected Shore hardness of the material is determined by the size and design properties of the damper. The thickness of the layer is also determined correspondingly. In general, it is 5-20 mm. The core and likewise the matching cut-out in the outer part preferably have a conical shape with an angle of preferably 30-50°, measured to the longitudinal axis of the functional part. However, other design solutions which have a corresponding elastic layer for absorption of the push deformation under operational conditions of the damper are conceivable and a subject-matter of the invention. In accordance with the invention, the elastomeric layer (1.2) (2.1) is connected directly to the additional elastomer volume (1.1), which is arranged within the functional part, for example in the outer part (1.4) or inner part (1.3), or alternatively may in a special embodiment be placed outside the damper itself. In the functional parts (1) and (2) of a damping element according to the invention, the layers (1.2) and (2.1) are preferably in conical-planar or concave/convex or spherical form; however, they may also have a cylindrical-planar design.

A damper according to the invention preferably has two identical or similar damping elements or functional parts (1) (2), where the additional elastomer volume is placed only in one functional part or in both functional parts or optionally outside the functional part, or even outside the damper.

The damping elements or functional parts (1) (2) are tensioned against one another by corresponding tensioning means (7), where they preferably have an in each case conical-planar outer part (1) and a conical-planar inner part (2), where the two elements can be tensioned against one another with the wide cone opening (O form) or with the narrow cone opening (X form). However, the elements (1) and (2) may also have a concave/convex design, so that a spherical shape of the layers is formed when the parts are fitted together. The tensioning of the elements (1) and (2) in each case takes place at a certain temperature. This sets a certain inherent frequency of the damper. Thin rubber layers in the functional parts (1.2+2.1) result in even small rotational angles of the tensioning means, preferably setting screws (7), resulting in a large change in the tensioned spring stiffness and thus a large change in the damper frequency. This in turn may result in the damper only being adjustable with difficulty via the tensioning means (7). The tensioning means (7) are therefore generally only intended for a rough adjustment of the damper frequency. The fine adjustment which is often necessary can be carried out via separate tensioning means (8), which can preferably directly influence the additional elastomer volume. These means displace rubber in the additional elastomer volume (1.1) and thus change the spring stiffness of the functional parts.

These tensioning means (8) additionally have a further job. If the additional elastomer volume (1.1) is vulcanized or also produced from a pourable polyurethane, this material contracts on cooling, and its volume is thus reduced. Any cavities which thus form are filled by displaced elastomer by the screwing-in of the tensioning means (8), which is important for a set constant inherent frequency of the damper.

The tensioning means (8) provided for the fine adjustment can in the simplest case be setting screws. Alternatively, active actuators, such as, for example, piezoactuators, magnets or also pneumatic/hydraulic cylinders, can also be employed. These actuators could be triggered in operation and thus increase or reduce the inherent frequency of the damper (active damper). If a lower inherent frequency is desired, the actuators will be triggered in such a way that they displace little rubber volume in the additional elastomer volume (1.1). In the case of an increasing damper frequency, the active actuators will displace more volume in the additional elastomer volume (1.1).

Figure 6:
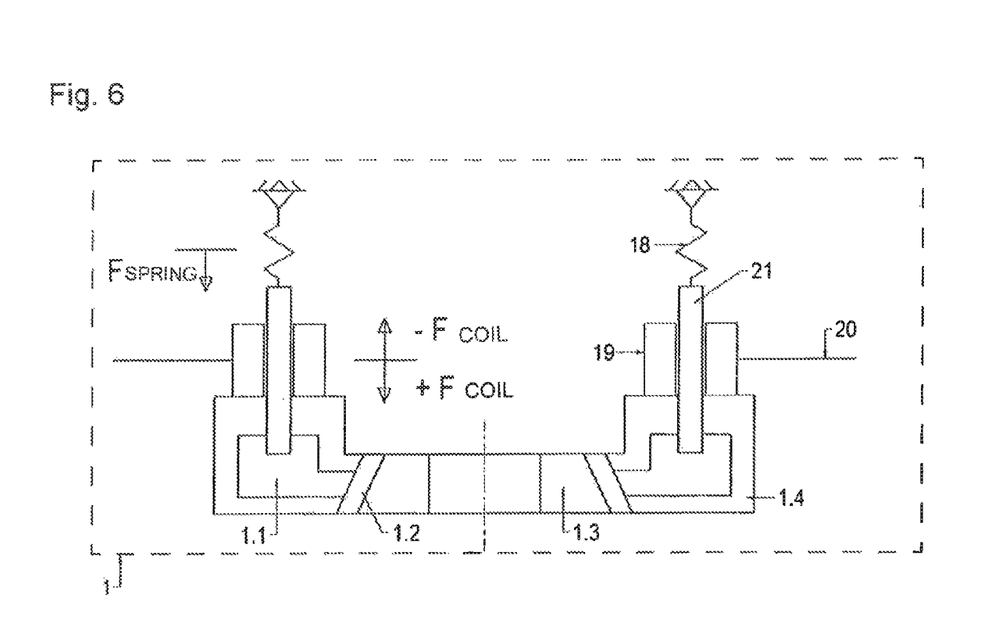
FIG. 6: shows a schematic damping element having an additional elastomer volume in the form of a ring-like structure which surrounds the conical functional part, where the additional elastomer volume, which is connected directly to the conical elastomer layer of the functional part, can be compressed or decompressed by means of a metal bolt which can be moved via a magnet coil.

In a particular embodiment, it is also possible to connect an electrical magnet coil (19) in series with a spring (18) and to use this unit as active actuator. This enables three positions of the metal bolt (21) to be achieved. Each individual position here corresponds to a different displacement of elastomer within the additional elastomer volume (1.1) and thus a different inherent frequency of the damper (FIG. 6):

Position 1:→Only spring force without additional coil force (coil without current)

Position 2:→Spring force+additional coil force

Position 3:→Spring force−additional coil force (reversal of the current direction)

Since a plurality of these active actuators can be installed, different positions of the active actuators amongst one another are possible. This enables the displaced elastomer volume to be changed in small steps. The more active actuators are installed, the smaller are these steps and thus the change jumps of the damper frequency.

Figure 5:
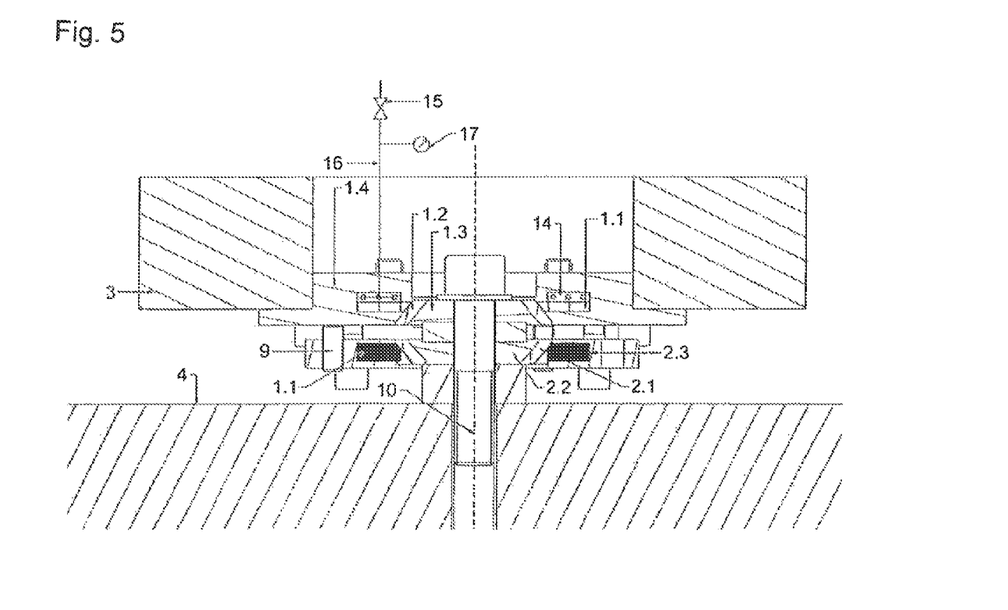
FIG. 5: shows the damper according to the invention in accordance with FIG. 2.1. The additional elastomer volume (1.1) can itself additionally be compressed or decompressed by an adjustable pressure ring which is located in the elastomer material of the additional elastomer volume, or is arranged above or below same. The pressure ring is itself an elastomer which has channels in its interior which can be pressurised and compress or decompress the surrounding elastomer material.

In a further embodiment of the invention, the tensioning means (8) with which the additional elastomer volume can be changed and which thus exert an influence on the damper frequency, may also be an adjustable pressure part (14), which is accommodated in the additional elastomer volume (1.1) itself, or is in direct contact therewith. The adjustable pressure part has the job of exerting pressure on the elastomer material of the additional elastomer volume and thus specifically compressing or decompressing the latter. For example, the pressure part may itself be an elastomer part having the same or different hardness which has in its interior cavities or conduits which can be charged with a hydraulic fluid or a gas via supply lines and thus result in a widening or narrowing of the cavities or conduits (FIG. 5). The pressure part, preferably a pressure ring (14), increases its volume with increasing filling pressure. Additional elastomer is thereby expelled out of the elastomer volume (1.1), which in turn enables the damper frequency to increase. If, by contrast, the pressure in the pressure ring (14) is reduced, the damper frequency drops.

It is not absolutely necessary for the elastic material within the functional part (1) (2) to be the same as in the additional reservoir (1.4). The functional part is preferably vulcanized with rubber or silicone. The additional reservoir (1.1), for example in the outer part (1.4), may be produced separately from another elastic material, preferably having a different coefficient of elasticity. The material used for this purpose should preferably have a large coefficient of thermal expansion. This reduces the requisite reservoir size in the outer part (1.4). In addition, this embodiment separated from one another simplifies production.

Figure 1:
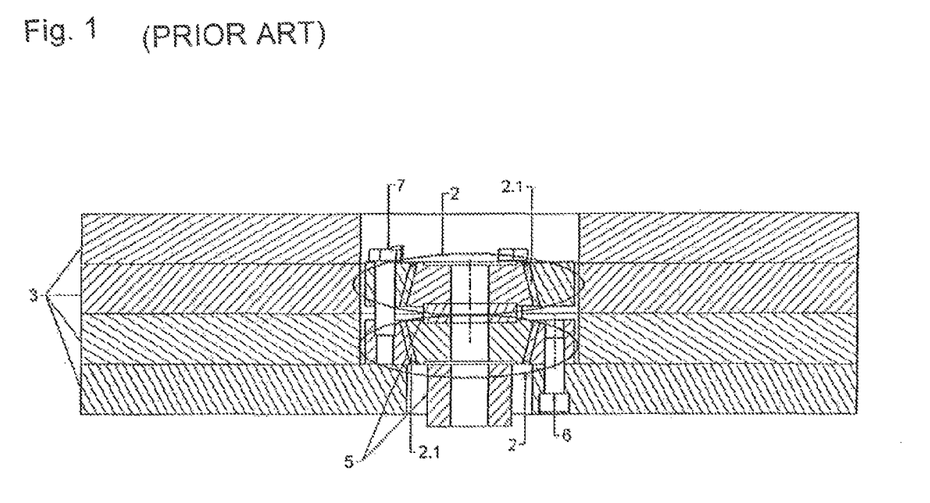
FIG. 1: shows a prior-art elastomeric damper known from EP 1 286 076 A1.
Figure 3:
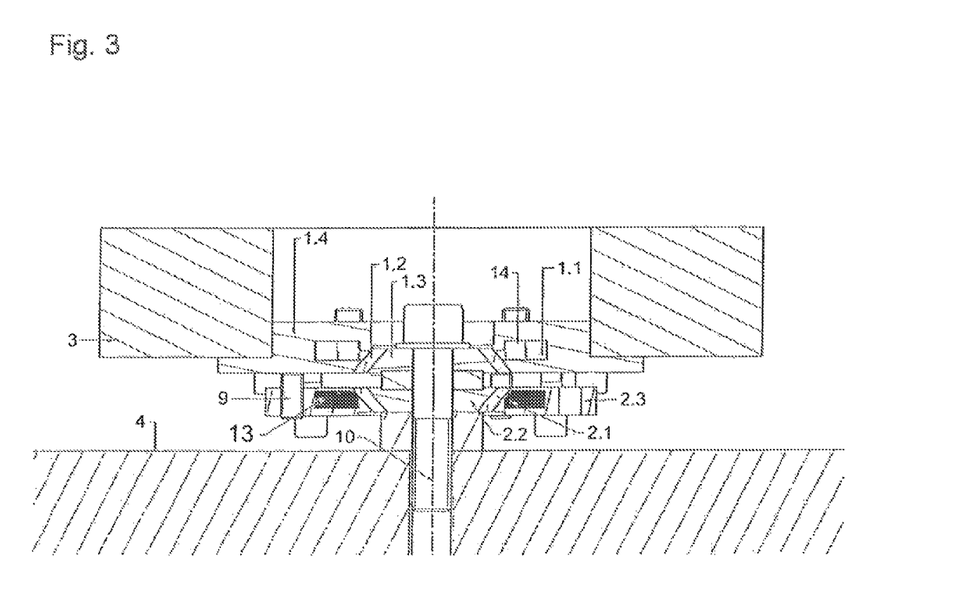
FIG. 3: shows a damper designed in accordance with FIG. 2.1 which additionally has a further additional elastomer volume in the second, lower functional part.

As already mentioned, the additional elastomer volume (1.1) can be accommodated only in one functional part or in both functional parts tensioned against one another (FIG. 3). This reduces the physical size, since the additional elastomer volume (1.1) is divided over a plurality of functional parts.

Figure 4:
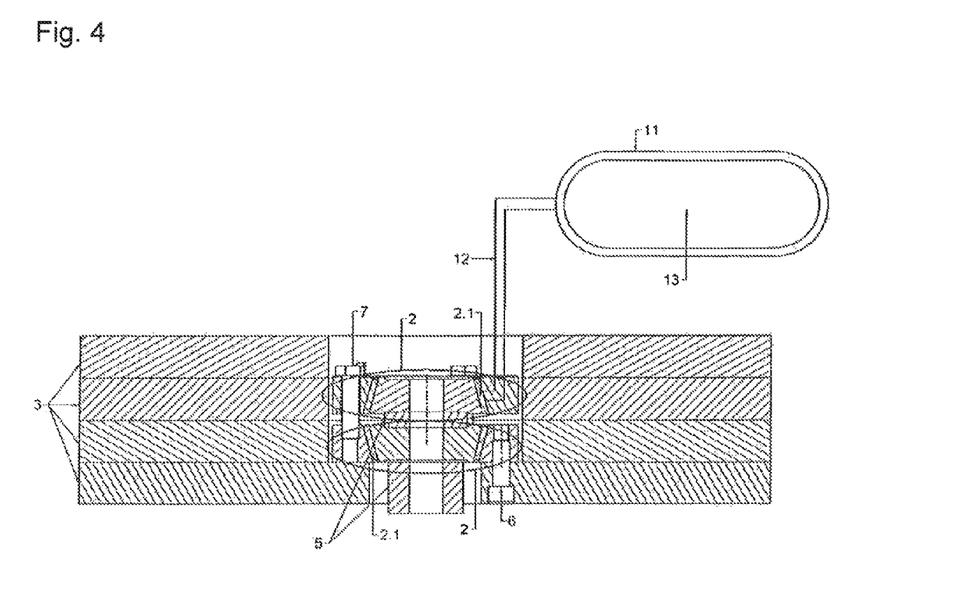
FIG. 4: shows a damper according to the invention in which the additional elastomer volume is arranged outside the functional elements (1) (2) and even outside the vibration damper.

In addition, it is possible, as already described, to accommodate the additional elastomer volume (1.1) outside the functional part (1) and not in the component (1.4) itself (FIG. 4). This separated arrangement has the advantage that the additional reservoir (11) can be placed anywhere and is thus not limited in its volume. The connection between this additional volume (13) and the rubber layer (2.1) within the functional part must take place here through a supply line (12) which only deforms slightly on a change in pressure. This applies equally to the container (11) which accommodates the additional volume (13). The volume (13) is preferably fully or partly filled with an elastomer. However, the volume (13) may also in accordance with the invention contain a liquid which has been selected so that a change in the physical state (for example liquid to solid) or in the viscosity occurs in the case of a change in temperature. This causes the functional volume to change, which has a direct effect on the damper frequency.

In addition, it is possible to produce the rubber layer (1.2) in the functional part (2) from an elastic material, while alternatively filling the separate pressure container (11) not with elastomer, but instead with a gas or a liquid. This has the advantage that lower friction values occur inside the supply line (12).

In a further embodiment, the container (11) can be specifically heated or cooled. This likewise enables the inherent frequency of the damper to be influenced actively. This heating or cooling can also be carried out directly via heating wires/cooling channels within the additional elastomer volume (1.1).

Figure 7:
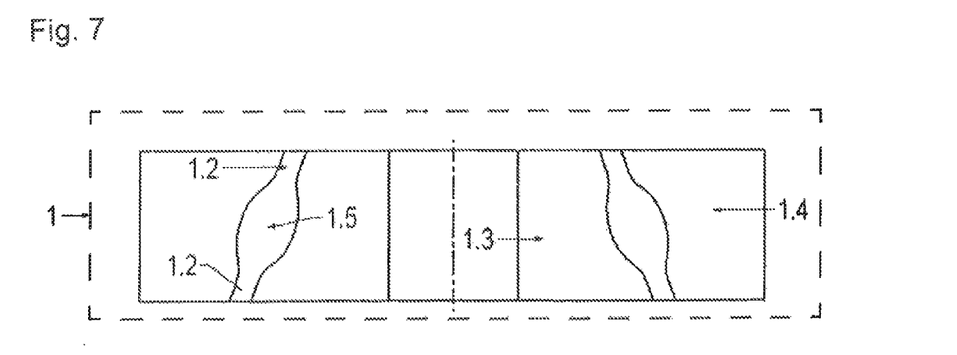
FIG. 7: shows a specific embodiment of a damping element according to the invention, where the additional elastomer volume (1.5) here represents part of the elastomer layer (1.2), and thus likewise participates in the push deformation occurring on the functional part.

In a particular embodiment of the invention, the additional elastomer volume (1.1) is integrated into the actual rubber layer (1.2) (FIG. 7). In this case, the additional elastomer volume at least partly participates in the push deformation of the damper in operation. This additional elastomer volume within the rubber layer (1.5) takes on the same job as the separate additional elastomer volume (1.1). This embodiment enables the design complexity for the functional part (1) to be reduced.

Figure 8:
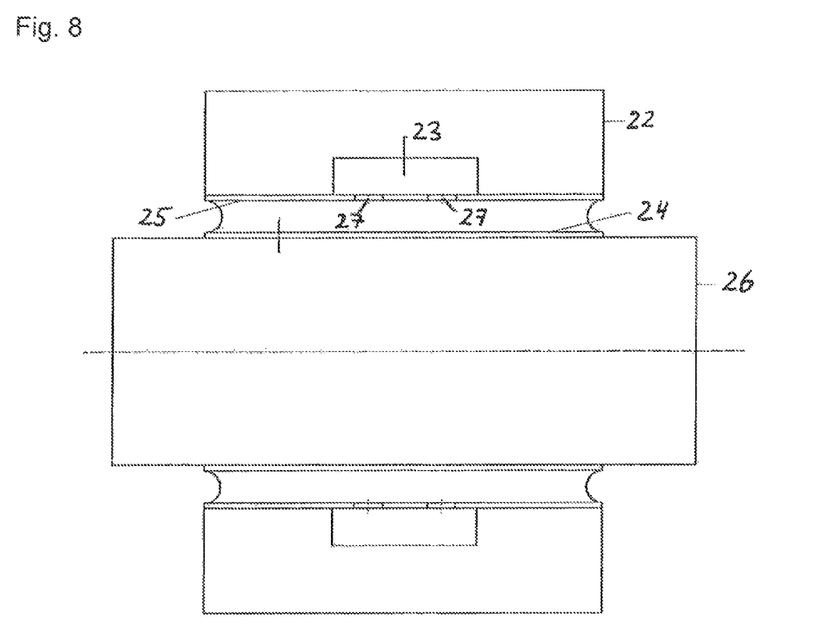
FIG. 8: shows an elastomeric bushing for an axle (26) in which the elastomer volume (28) is connected to an additional elastomer volume (23) outside the elastomer bushing in the housing (22).

This design can also be applied to gearbox bushings (FIG. 8). These also consist of rubber and thus change their spring stiffness via the temperature to the same extent. This behaviour is also undesired. This change in the spring stiffness via the temperature can be minimised in accordance with the same functional principle as described above. In this case, the additional elastomer volume (23) forms via a recess in the housing (22), which is filled with rubber or an elastic alternative material (silicone, polyurethane, etc.). This additionally formed elastomer volume (23) is connected to the actual elastomer layer of the bushing (28) via connecting holes in the outside metal sheeting of the bushing (27). If the temperature now drops, the elastomer layer of the bushing (28) becomes stiffer. Acting against this, the now-larger rubber volume contracts to a greater extent, this counters the hardening.

Figure 9:
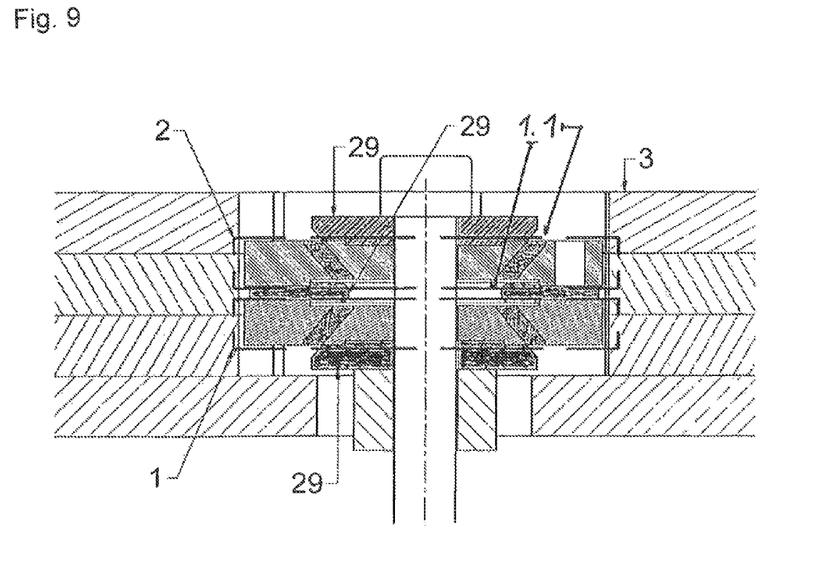
FIG. 9: shows a temperature-compensatable damper according to the invention which has discs (29), all or some of which have bevels (30), with which displaced elastomer material from (1.2), (2.1) and/or (1.1) can be in contact, or can fill the space formed by the bevels.
Figure 21:
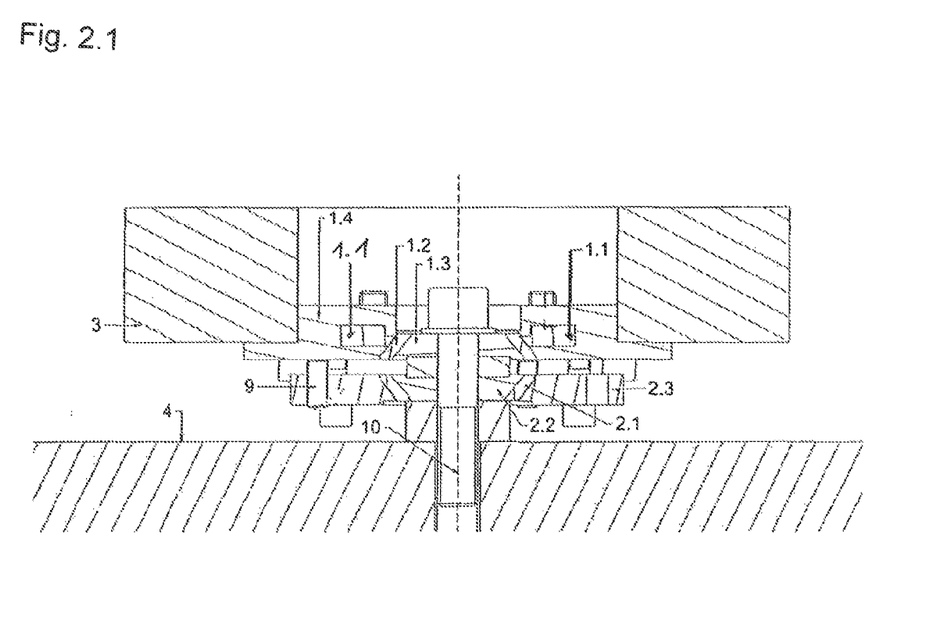
Figure 22:
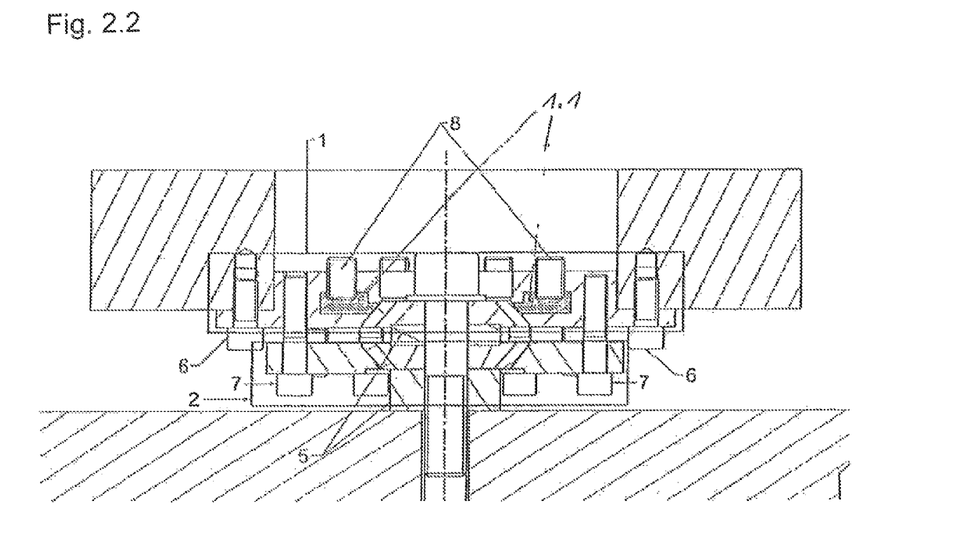

In a further-refined embodiment of the described dampers in accordance with the invention, the frequency setting range of the damper can be influenced as follows: as already described, the elastomer volume (1.1+1.2+2.1) contracts in the case of a drop in temperature. This causes the pretensioning of the functional parts (1+2) tensioned against one another to reduce. This results in a reduction in the damper frequency. At the same time, dynamic hardening of the rubber layer (1.2+2.1) occurs. This effect results in an increase in the damper frequency. The additional elastomer volume (1.1) must accordingly be designed in such a way that the two effects compensate one another. If functional parts (1) (2) which have a highly progressive characteristic line are now installed, small changes in pretensioning result in a large change in the damper frequency. The additional elastomer volume (1.1) can thus come out smaller than in the case of less highly progressive functional parts (1) (2). The progressivity (large change to the vibration/damping properties) of the functional parts (1+2) can be achieved on the one hand, as described above, via the geometry of the rubber layer (1.2+2.1) on the other hand in accordance with the invention via additional discs (29), which can come into contact with the rubber layer in question. In accordance with the invention, the discs (29) preferably consist of non-elastic material and preferably have, at least at the edges, bevels which are connected to the elastic layers (1.2) or (2.1) directly or via the additional elastomer volume (1.1) or via the additional volume (13). If the axial pretensioning is now changed, the bevels of the discs (29) come into ever closer contact with the rubber layers (1.2+2.1) or where appropriate also with the additional elastomer volume (1.1) or (13), or the volume additionally formed by the bevels is increasingly filled by the elastic material from (1.2), (2.1), (1.1) or (13). The displaced rubber volume can thus escape unhindered from the rubber layer (1.2) (2.1) or where appropriate (1.1) or (13). This effect allows the progressivity of the functional parts (1) (2) to increase greatly. This effect can be utilized to extend the frequency range of the damper in the upward direction, where the damper frequency increases more than if no discs (29) were present. The discs (29) thus extend the frequency range of the damper towards higher values, irrespective of whether the damper is temperature-compensated or whether it is a temperature-dependent damper. However, it is not absolutely necessary for the discs (29) to have bevels. In this case, the displaced elastomer volume comes into contact with the discs (29) without bevels, or the displaced elastomer volume from the functional part (1) comes into contact with the displaced elastomer volume from the functional part (2). In accordance with the invention, the damper according to the invention comprises at least one disc (29), which is installed above or below the functional part (1) or (2), and, as described, is functionally connected thereto. A damper according to the invention preferably comprises two or three discs (29), which are installed above and/or below and/or between the functional parts (1) and (2), and are connected or may be connected to the elastic layers or volumes (1.2) (2.1) (1.1) (13), in accordance with the particular embodiment of the invention.

BRIEF DESCRIPTION OF THE REFERENCE NUMERALS USED

1. Functional part 1
1.1 additional elastomer volume
1.2 rubber layer/silicone layer/polyurethane layer
1.3 core 1.4 outer part with elastomer reserve
2. Functional part 2
2.1 rubber layer/silicone layer/polyurethane layer
2.2 core
2.3 outer part
3. Damper mass
4. Component to be damped
5. Adapter
6. Damper mass attachment screw
7. Setting screw
8. Fine adjustment setting screw
9. Forcing screw
10. Damper attachment screw
11. Separate pressure container
12. Supply line
13. Additional elastomer volume (outside functional part)
    alternatively: liquid or gas as filling medium
14. Pressure ring
15. Shut-off valve
16. Supply line
17. Manometer
18. Spring
19. Electrical magnet coil
20. Magnet coil current connection
21. Metal bolt
22. Housing
23. Additional elastomer volume in housing
24. Inside metal sheeting of bushing
25. Outside metal sheeting of bushing
26. Axle
27. Connecting holes in outside metal sheeting
28. Elastomer layer of bushing
29. Disc with bevel

The invention claimed is:

1. A temperature-compensatable damping element (1) which is suitable for temperature-independent reduction of vibrations of a component (4) to be damped, the damping element comprising:
   a rigid, non-elastic outer element (1.4),
   a rigid, non-elastic inner element (1.3) being inserted, either fully or partly, into a correspondingly shaped cut-out or opening of the outer element,
   the outer and the inner elements having contact surfaces which face each other and being connected to one another by an elastic layer (1.2) which comprises a first elastomer material and which is pretensionable with respect to a desired frequency by a tensioning means, the elastic layer being arranged between the contact surfaces of the outer and the inner elements,
   the elastic layer (1.2), which is responsible for vibration damping, being directly connected, at least one location, to an additional elastic volume (1.1), and the additional elastic volume (1.1) accommodating a second material having a coefficient of thermal expansion which is greater than a coefficient of thermal expansion of the first elastomer material forming the elastic layer (1.2),
   the additional elastic volume (1.1) being 5 to 100 times greater than a volume of the elastic layer (1.2), and having an effect that an excitation frequency of the damping element changes by a maximum of 10% in a case of a temperature change in a temperature range between about −30° C. and +50° C., wherein the contact surfaces of the outer and the inner elements of the first and the second damping elements are either conical or spherical.

2. The damping element according to claim 1, wherein the additional elastic volume (1.1) is 5 to 25 times the volume of the elastic layer (1.2).

3. The damping element according to claim 1, wherein the contact surfaces of the outer and the inner elements are one of conical-planar, cylindrical-planar, spherical, convex and concave, and the elastic layer (1.2) has a corresponding shape.

4. The damping element according to claim 1, wherein the additional elastic volume (1.1) is located in the outer element (1.4).

5. The damping element according to claim 1, wherein the additional elastic volume (1,1) is located in the inner element (1.3).

6. The damping element according to claim 1, wherein the additional elastic volume (1.1, 13) is located outside the damping element (1) and is connected, by connections (12), to the elastomer layer (1,2).

7. The damping element according to claim 1, wherein the additional elastic volume (1.1) is formed by at least one of cut-outs or cavities in the contact surfaces of the outer and the inner elements (1.1) (1,3) of the damping element.

8. The damping element according to claim 1, wherein the second material is one of an elastomer material, a gas, a liquid and a viscous material.

9. The damping element according to claim 1, wherein the additional elastic volume (1.1) is additionally either compressible or decompressible by a pressure means.

10. The damping element according to claim 9, wherein the pressure means comprises at least one tensioning screws (8).

11. The damping element according to claim 9, wherein the pressure means comprises a metal bolt (18-21) operated by an electrical magnet coil.

12. A temperature-independent vibration damper (1) in combination with a damper mass (3) and first and second damping elements which are suitable for temperature-independent reduction of vibrations of a component (4) to be damped, the temperature-independent vibration damper comprising:
   a rigid, non-elastic outer element (1.4),
   a rigid, non-elastic inner element (1.3) which is inserted, either fully or partly, into a correspondingly shaped cut-out or opening of the outer element,
   the outer and the inner elements having contact surfaces which face each other and being connected to one another by first and second elastic layers (1.2) each comprising a first elastomer material and which is pretensionable with respect to a desired frequency by a tensioning means, each of the first and the second elastic layers being delimited between the contact surfaces of the outer and the inner elements,
   each of the first and the second elastic layers (1.2), which is responsible for vibration damping and for reduction of a push deformation in a case of vibration forces caused during operation, being directly connected, at at least one location, to a respective additional amount of elastic (1.1) which is accommodated in one of the outer element (1.4) or the inner element (1.3), and each of the additional elastic volumes (1.1) accommodating a second elastomer material, the second material having a coefficient of thermal expansion which is greater than a coefficient of thermal expansion of the first elastomer material forming the elastic layer,
   each of the additional elastic volumes (1.1) having a volume that is 10-20 times a volume of the elastic layer (1.2), and having an effect that an excitation frequency of the damping element changes by a maximum of 10% in a case of a temperature change in a temperature range between about −30° C. and +50° C., wherein the contact surfaces of the outer and the inner elements of the first and the second damping elements are either conical or spherical.

13. The temperature-independent vibration damper according to claim 12, wherein the first and the second elastic layers are tensionable against one another by another tensioning means (7).

14. The temperature-independent vibration damper according to claim 13, wherein only one of the outer and the inner elements (2.3, 2.2) of the second damping element supports the additional elastic volumes (1.1).

* * * * *